United States Patent [19]

Knutsen

[11] Patent Number: 5,005,152
[45] Date of Patent: Apr. 2, 1991

[54] INDUSTRIAL CONTROLLER WITH DECOMPILABLE USER PROGRAM

[75] Inventor: Neil W. Knutsen, Milwaukee, Wis.

[73] Assignee: Allen-Bradley Company, Milwaukee, Wis.

[21] Appl. No.: 333,196

[22] Filed: Apr. 5, 1989

[51] Int. Cl.$^5$ .......................... G06F 9/44; G06F 3/153
[52] U.S. Cl. ..................... 364/900; 364/973; 364/926.9; 364/949; 364/977; 364/147
[58] Field of Search .............. 364/200 MS, 900 MS, 364/146, 147, 191–193

[56] References Cited

U.S. PATENT DOCUMENTS

| | | | |
|---|---|---|---|
| 4,316,260 | 2/1982 | Hideshima et al. | 364/147 X |
| 4,326,207 | 4/1982 | Suda et al. | 364/900 |
| 4,425,630 | 1/1984 | Yomogida et al. | 364/900 |
| 4,432,047 | 2/1984 | Okayama | 364/140 X |
| 4,449,180 | 5/1984 | Ohshima et al. | 364/147 |
| 4,742,443 | 5/1988 | Rohn et al. | 364/200 |

OTHER PUBLICATIONS

Specification, Ser. No. 07/161,484, Flood et al., filed Feb. 29, 1989.

Primary Examiner—Gareth D. Shaw
Assistant Examiner—P. V. Kulik
Attorney, Agent, or Firm—Quarles & Brady

[57] ABSTRACT

A decompiler for industrial controllers operates on ladder logic programs that have been compiled into series jump format machine code. Series jump machine code evaluates ladder logic rungs through jump instructions jumping to a COIL ON routine, a COIL OFF routine, or another jump instruction, where each contact of the rung is associated with a single jump instruction. The decompiler creates a matrix of connection nodes then simplifies the matrix to return the ladder logic program. A decompiled ladder diagram may be thereby produced without the need for non-executable source code "tokens" included within the compiled machine language program.

3 Claims, 14 Drawing Sheets

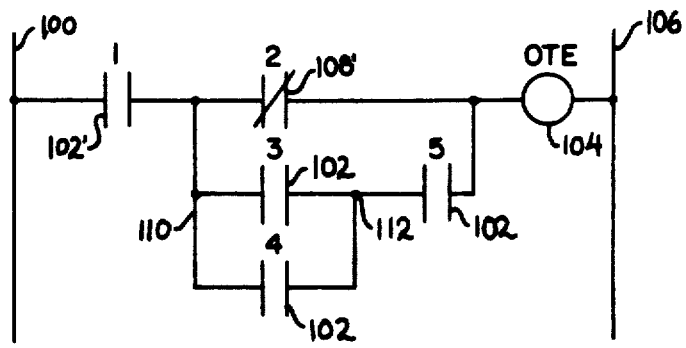

FIG. 12a)

{XIC1 [(XIO2)[(XIC3)(XIC4)]XIC5)]}

WHERE   { = SOR  } = EOR
        [ = BST  ] = BND
        ( = LST  ) = LND
        XIO = EXAMINE IF OPEN
        XIC = EXAMINE IF CLOSED
        OTE = OUTPUT

FIG. 12b)

|   |     |                  | REMARKS |
|---|-----|------------------|---------|
| 1 |     | JNB C.1, OFF     | JUMP IF BIT "C.1"* <u>NOT</u> SET TO "OFF" |
| 2 |     | JNB C.2, ON      | JUMP IF BIT "C.2" <u>NOT</u> SET TO "ON" |
| 3 |     | JB  C.3, T5      | JUMP IF BIT "C.3" IS SET TO "T5" |
| 4 |     | JNB C.4, OFF     | JUMP IF BIT "C.4" IS SET TO "OFF" |
| 5 | T5: | JB  C.5, ON      |         |
| 6 | OFF:| [COIL OFF ROUTINE] | ROUTINE TO TURN COIL OFF- ENDS IN JUMP |
| 7 | ON  | [COIL ON ROUTINE] |         |

*C IS THE BIT IN THE INPUT IMAGE TABLE REPRESENTING THE STATE OF CONTACT X.

|   | 1 | 2 | 3 | 4 | 5 |
|---|---|---|---|---|---|
| 1 |   | 1 |   |   | 1 |
| 2 |   |   | 1 | 1 | -1 |
| 3 | 1 | -1 | -1 | -1 |   |
| 4 | -1 |   |   |   |   |

|   | 1 | 2 | 3+4 | 5 |
|---|---|---|---|---|
| 1 |   | 1 |   | 1 |
| 2 |   |   | 1 | -1 |
| 3 | 1 | -1 | -1 |   |
| 4 | -1 |   |   |   |

|   | 1 | 2 | (3+4)·5 |
|---|---|---|---|
|   |   | 1 | 1 |
|   | 1 | -1 | -1 |
|   | -1 |   |   |

|   | 1 | 2+((3·4)·5) |
|---|---|---|
|   |   | 1 |
|   | 1 | -1 |
|   | -1 |   |

| 1·(2+((3·4)·5)) |
|---|
| 1 |
|   |
|   |
| -1 |

{x1c1[(x1c2)[[(x1c3)(x1c4)]x1c5]]}

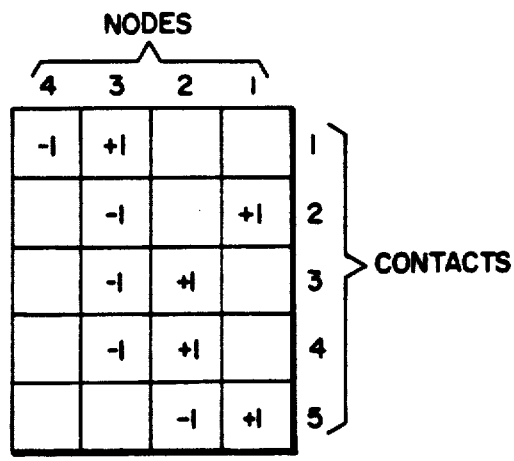
FIG. 15a
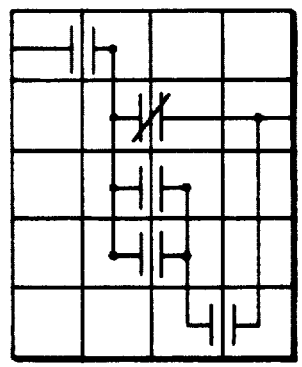
FIG. 15b
FIG. 15c
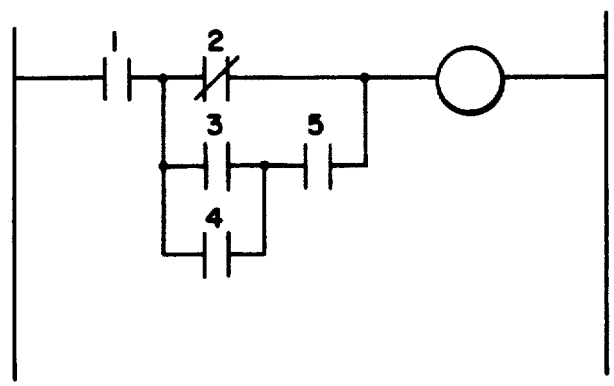

INDUSTRIAL CONTROLLER WITH DECOMPILABLE USER PROGRAM

BACKGROUND OF THE INVENTION

This application relates to industrial controllers and more particularly to a method of recreating the ladder logic source code used in programming such controllers, from the user compiled program run by such controllers, without the use of "tokenized" decompiling instructions.

Industrial controllers such as those described in U.S. Pat. Nos. 3,810,118; 3,942,158, 4,165,534 and 4,442,504 are typically connected to industrial equipment such as assembly lines or machine tools to operate such equipment in accordance with a stored program. In industrial controllers, such as those disclosed in the above cited patents, the stored program includes instructions which, when executed, examine the condition of selected sensing devices on the controlled equipment or energize or de-energize selected operating devices on the controlled equipment contingent on the status of one or more of the examined sensing devices. Inputs to the controller may be discrete binary signals such as from switches which may detect limits of motion, temperature, time, or other continuously variable quantities, or the inputs may be analog measures of the quantities themselves which are generally then converted to digital binary form for processing.

Likewise, the outputs of the controller may be either binary outputs as implemented by mechanical or solid-state relays, or analog outputs produced by means of a digital to analog converter.

Industrial controllers are typically programmed in a ladder logic language in which instructions are represented by the elements of a relay ladder diagram. The ladder logic language is in a form readily understood by control engineers and has become largely standardized in the industry. Program panels such as those disclosed in U.S. Pat. Nos. 3,798,612, 3,813,649 and 4,070,702 have been developed to assist the user in developing and editing ladder logic programs.

During execution, ladder logic programs are converted on an instruction-by-instruction basis to machine code instructions that may be executed directly by the computer hardware that forms the basis of the controller. This conversion is performed by an interpreter program which analyzes each ladder rung or subpart of a rung and presents the computer with a machine code subroutine defined by that part of the ladder. Accordingly, an industrial controller programmed in the ladder logic language may be executed on a machine designed around conventional computer architecture.

There are two drawbacks to interpreter base controllers. First, the interpreter program must be stored in the controller memory along with the ladder logic program during the operation of the controller. This limits the memory available for the ladder logic program. Second, the continuous interpretation of the ladder logic program during the controller operation slows the controller operation. The resultant speed limitations reduce the length of the ladder logic program that may be executed.

One well known way of speeding up program execution and improving memory usage is to compile the ladder logic program into machine code and to store only the machine code in the controller during operation. A duplicate of the original ladder logic program is stored separately, for example, on floppy disk or magnetic tape, to be used if later changes are to be made in the program. However, storing copies of the original ladder logic program may not be convenient in an industrial environment where they must be stored separately from the controller to protect them from contamination or erasure.

An alternative approach is to "decompile" the stored machine code back into the ladder logic program that may be understood and edited by the programer. The decompiling and compiling program may be stored in a separate programming terminal to avoid taking up controller memory space. While this approach is extremely attractive from the point of view of operator convenience, under many current compilation techniques it may be impossible to reconstruct the ladder logic program from the machine code. This occurs because many compilation techniques effectively discard information necessary to uniquely identify which of the many ladder logic structures generated the particular logic sequence embodied in the machine code.

Accordingly such compilers may include additional source language "tokens" in the compiled machine code, not executed by the controller, but serving only to aid in decompiling the machine code to ladder logic instructions. An example of such a technique is described in co-pending U.S. Pat. No. application 07/161,484 filed Feb. 29, 1988.

SUMMARY OF THE INVENTION

The present invention relates to a decompiler for industrial controllers, and more specifically to a decompiler that can operate directly on machine code, without source code tokens, to return the original ladder diagram.

The decompiler follows a set of predefined rules to read the user program instructions stored in the controller memory and to construct an interconnection matrix whose columns represent contact numbers and whose rows represent nodes where contacts connect. Data stored in this interconnection matrix may be employed to reproduce the graphical structure of the source ladder diagram or it may be parsed to produce a machine readable representation of the original ladder diagram for editing purposes.

One object of the invention is to reduce the required memory capacity of the controller. The ability to reconstruct a ladder diagram directly from machine code without storing source code tokens reduces the amount of controller memory required to hold the compiled controller program. The decompiler operates directly on a machine code implementation of the ladder logic program in which contacts are represented solely by conditional branch or jump statements whose targets are other branch or jump statements or the COIL ON and COIL OFF routines.

Yet another object of the invention is to permit ready editing of a stored machine code program without referring to copies of the original source ladder logic program. Editing requires that the program exist as I-code, an editor readable version of the graphical ladder diagram. The interconnection matrix generated by the decompiler may be parsed to I-code through the application of a series of matrix simplification rules which combine parallel and series contacts within the matrix while tabulating an I-code string representation of the ladder contacts The ability to decompile the object machine code into I-code eliminates the need to retain an editing copy of the source ladder logic program.

Another object of the invention is to permit the decompilation of ladder logic programs from machine code compiled in a form that is fully relocatable. The decompiler works with a series jump format machine code which is primarily comprised of conditional jump instructions. Such instructions use relative addressing and are readily relocated within the controller's memory.

A further object of the invention is to provide rapid compilation and decompilation of ladder logic programs. The series jump format machine code that is produced by the compiler is compiled in a manner which avoids forward references and hence may be compiled in a single pass.

The foregoing and other objects and advantages of the invention will appear from the following description In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

Figure 4:
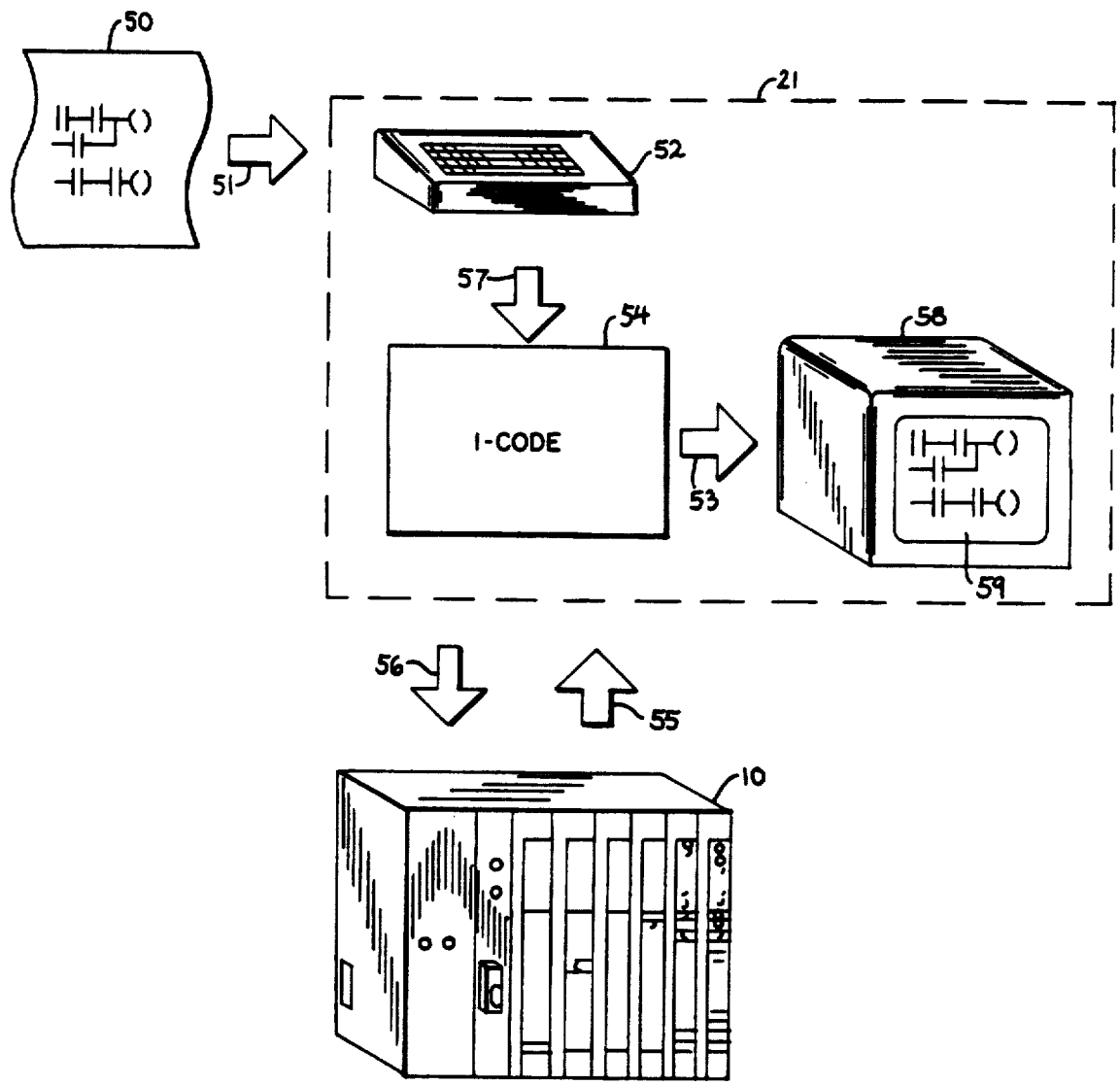
FIG. 4 is a general flow chart of the transformation of a ladder logic control program to series jump format machine code.
Figure 6:
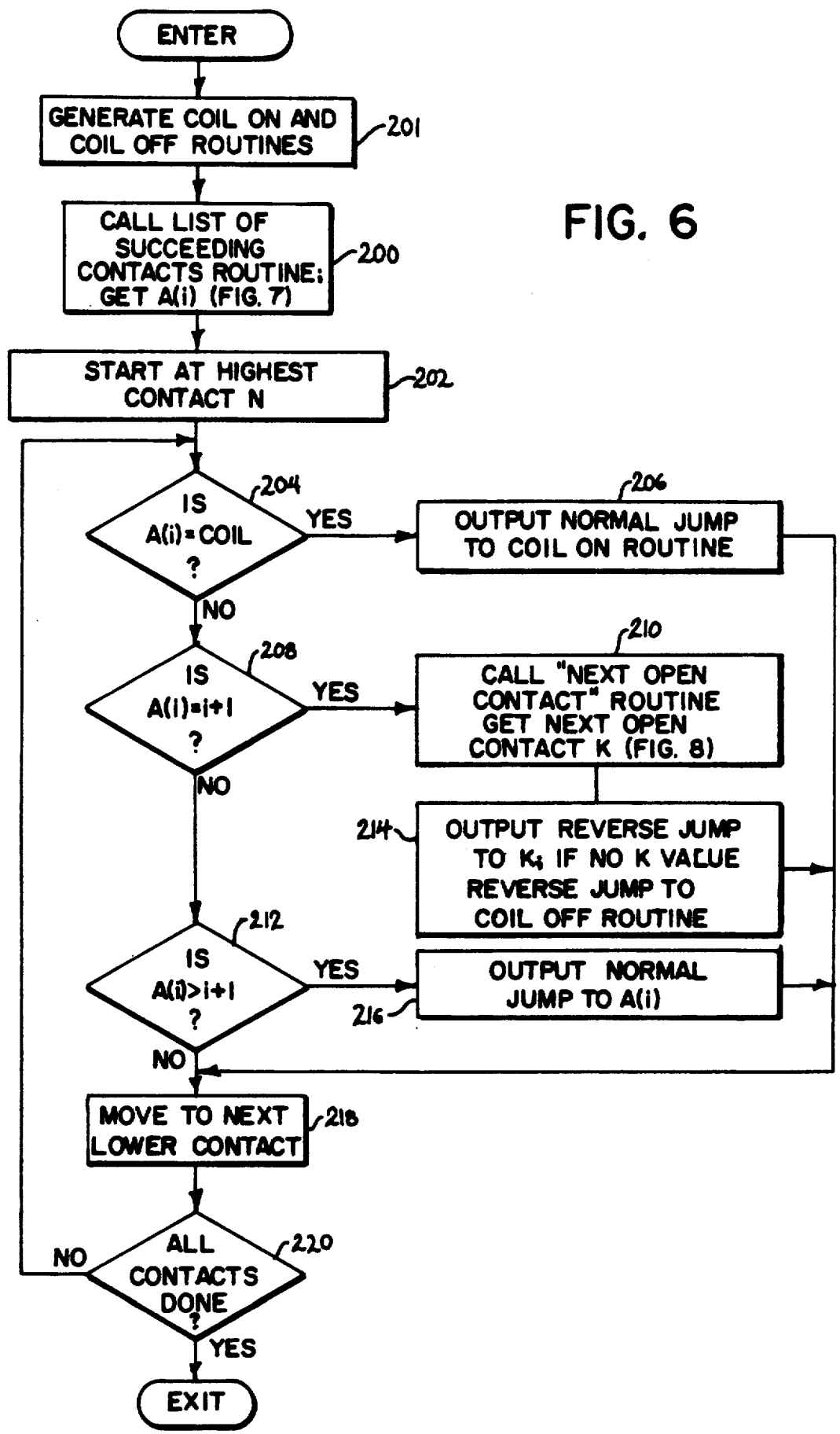
Figure 7:
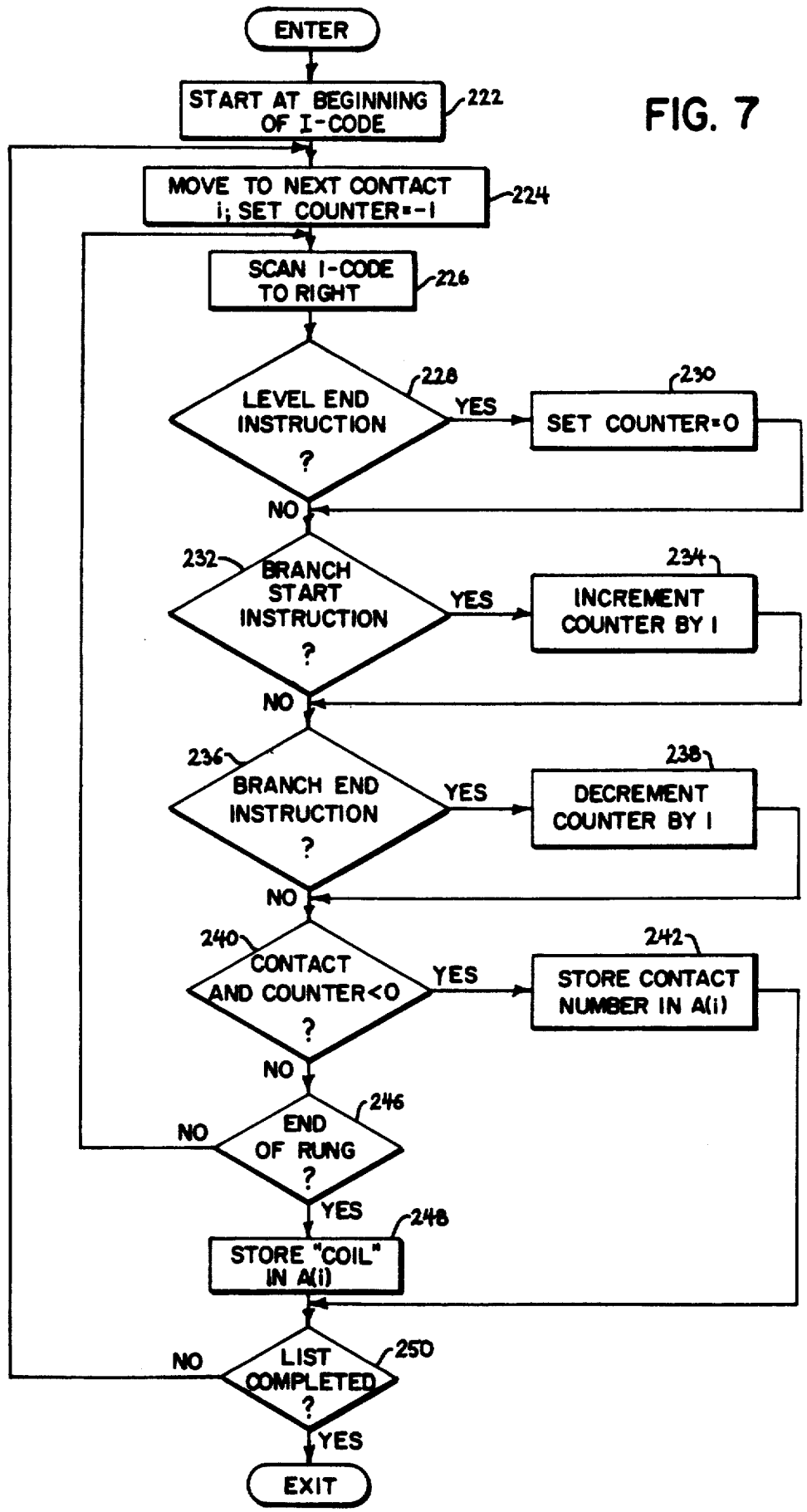
Figure 8:
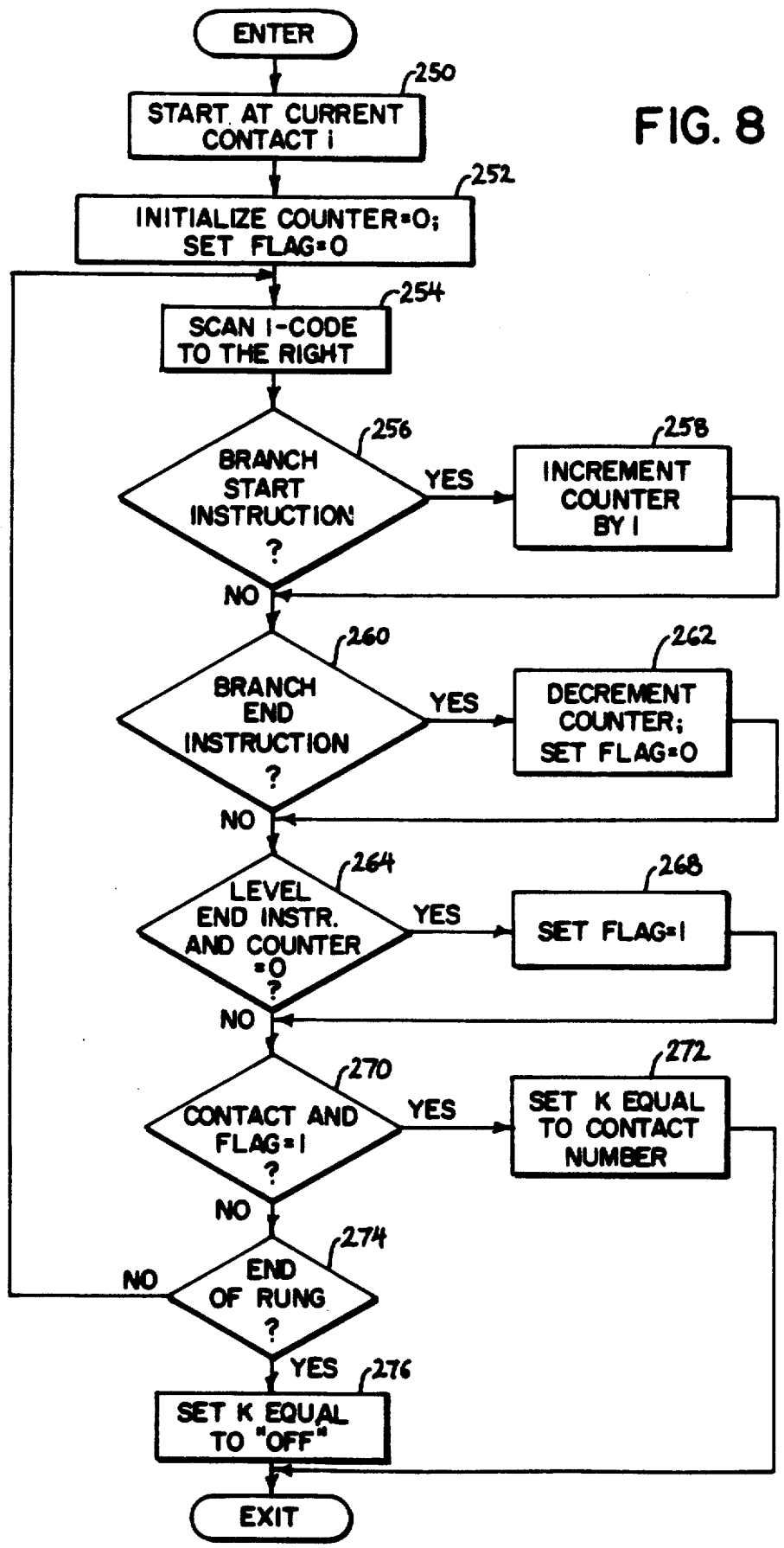
Figure 9:
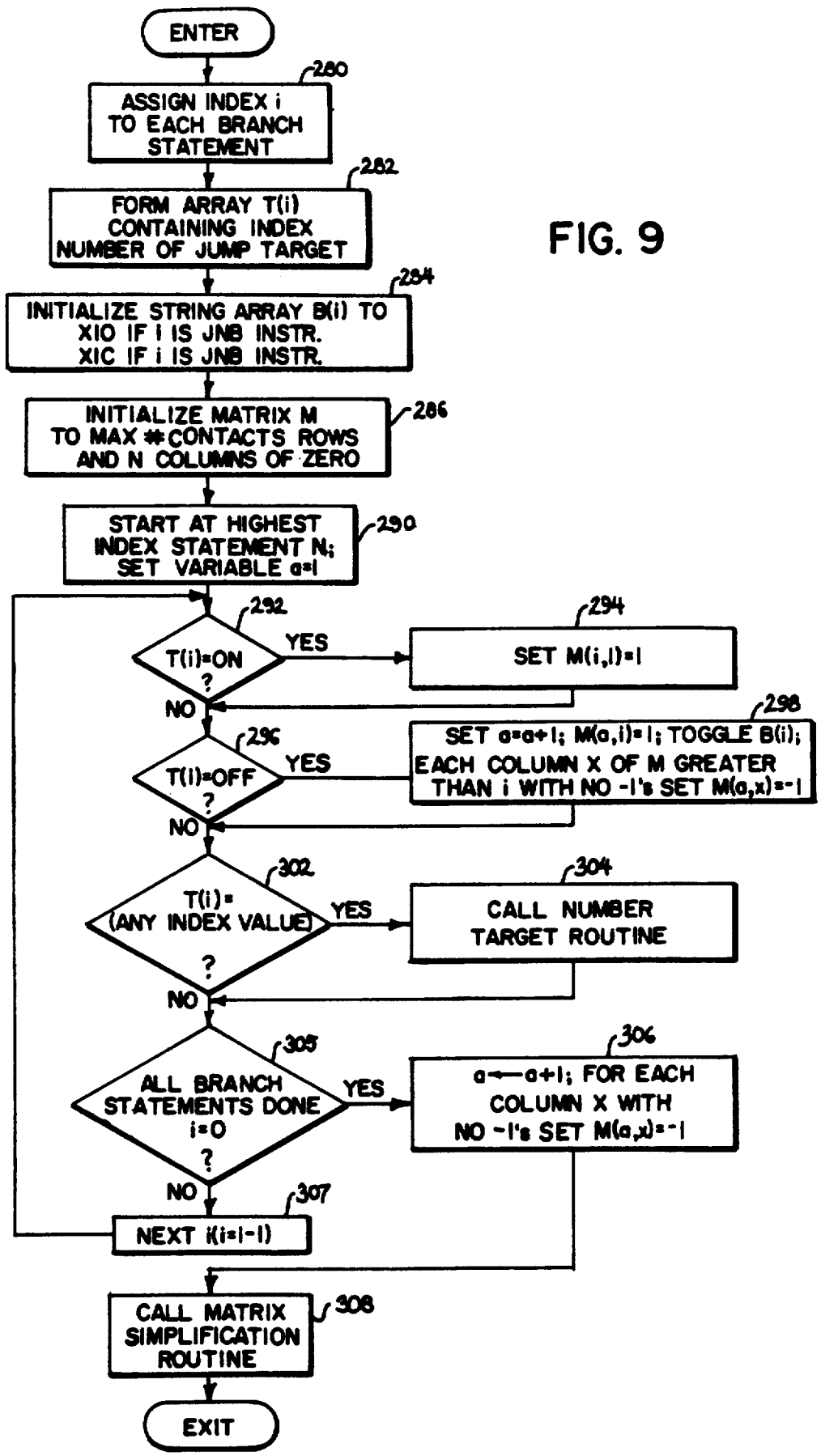
Figure 10:
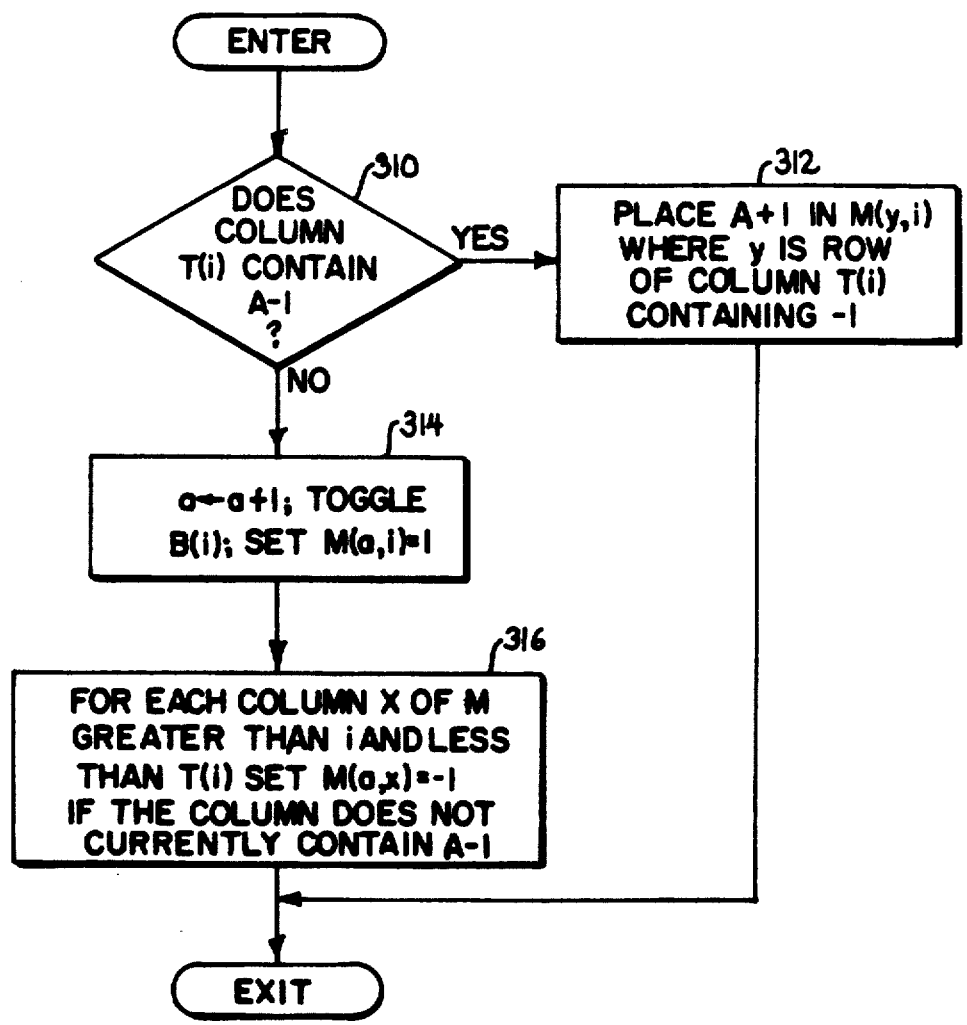
Figure 11:
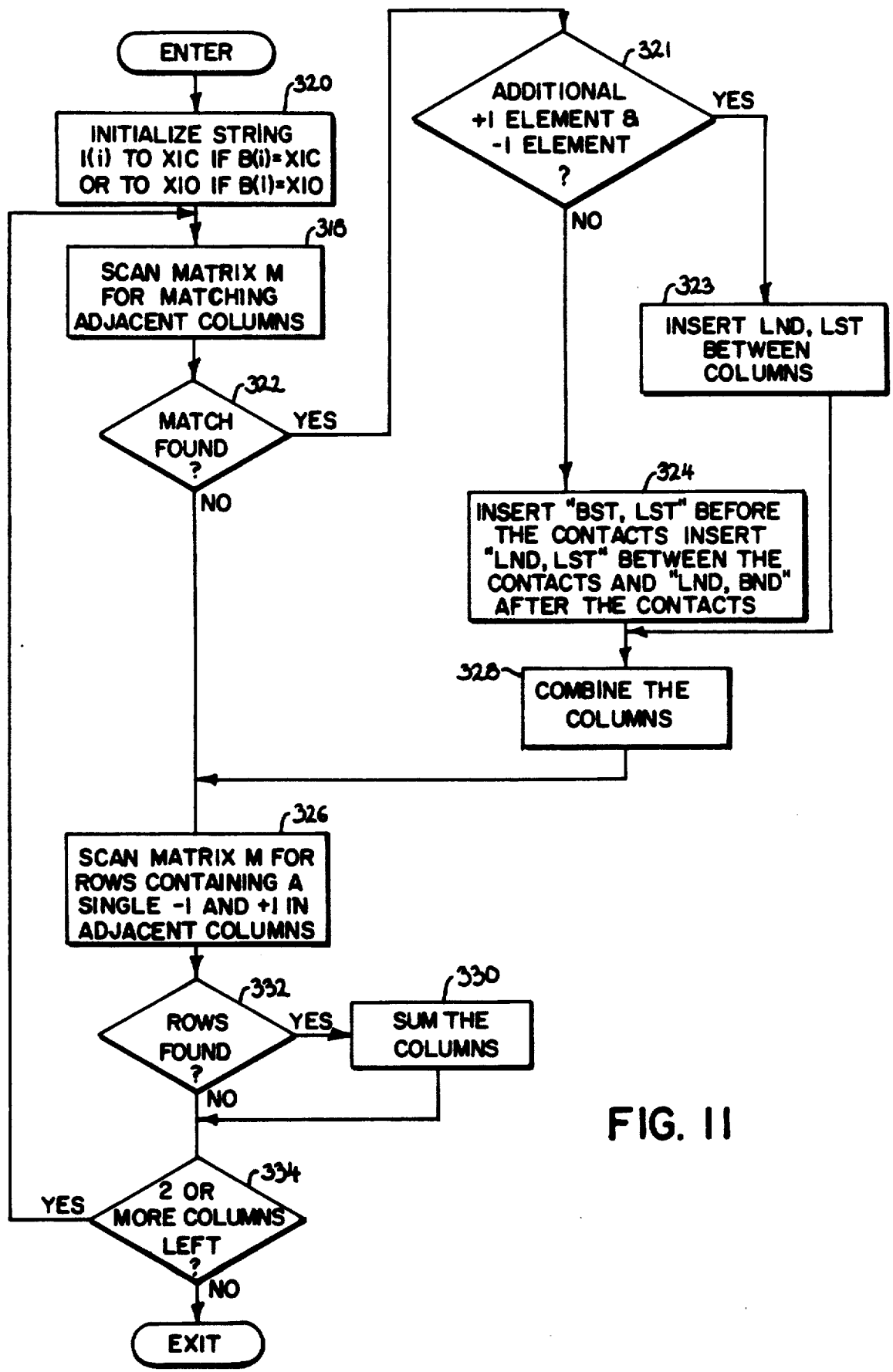

There is no FIG. 5;

FIG. 6 is a detailed flow chart showing the compilation of I-code to series jump format machine code shown in FIG. 4;

FIG. 7 is a flow chart of the succeeding contacts routine used by the compilation program shown in FIG. 6;

FIG. 8 is a flow chart of the next open contact routine used by the compilation program shown in FIG. 6;

FIG. 9 is a detailed flow chart showing the decompilation of series jump format machine code to I-code shown in FIG. 4;

FIG. 10 is a flow chart of the number target routine used by the decompilation program shown in FIG. 9;

FIG. 11 is a flow chart of the matrix simplification routine used by the decompilation program shown in FIG. 9;

FIG. 12(a) is an exemplary ladder logic diagram prior to the transformations of FIG. 4;

FIG. 12(b) is an ASCII string representation of the I-code produced by the ladder logic diagram of FIG. 12(a).

FIG. 12(c) is a simplified representation of the series jump format machine code produced by the compiler from the I-code of FIG. 12(b);

FIG. 13(a)-(g) illustrates a step-by-step decompilation of the machine code shown in FIG. 12(c);

FIG. 14a)-(e) illustrates the matrix simplification routine used by the decompilation routine FIG. 15(a)-(c) illustrates the use of the interconnection matrix to reconstruct the graphical ladder logic diagram.

GENERAL DESCRIPTION OF LADDER LOGIC PROGRAMMING

Referring to FIG. 4, the user develops an I-code representation of his ladder logic program 50 using a keyboard 52 as represented by arrow 51 and 57. A ladder logic diagram 59 is displayed on a screen 58 so that the operator can confirm the accuracy of his work and edit it to conform to the desired ladder logic program 50. The keyboard 52 and screen 58 form part of a programming terminal 21 such that described in U.S. Pat. No. 4,527,250 issued July 2 1985 and entitled: "Video Computer terminal with Detachable Intelligent Keyboard Module".

Using programming terminal 21, the entered I-code 54 is compiled into machine code as indicated by arrow 56, and loaded into the industrial controller 10. The terminal 21 is then disconnected and the machine code stored in the industrial controller 10 operates the industrial controller 10 in accordance with the stored ladder logic program. The ladder logic program stored in the controller 10 contains instruction which are directly executable by the controller's processor, but which are not directly translatable into a ladder logic diagram 59. At any time, the user may want to edit this control program stored in the industrial controller 10. This is accomplished according to the present invention by reconnecting the programming terminal 21 and offloading the machine code form of the user program and decompiling the machine code stored in the controller 10 to reproduce the I-code 54. This process is indicated in FIG. 4 by arrow 55 and it is carried out in the programming terminal 21. The user may then edit the ladder logic program as displayed as a ladder diagram 59 on screen 58 by means of the keyboard 52.

Ladder Logic Program

The ladder logic program 50 is generated by the user as dictated by the requirements of the equipment or process being controlled and is written in a ladder logic diagram form, familiar to control engineers. Referring to FIG. 12(a), there is shown an example rung of a ladder diagram as might be created as part of ladder logic program. As per convention, two power rails are designated by vertical lines 100 and 106 on opposite sides of the diagram. Between the power rails 100 and 106, the operator forms the horizontal rungs of the ladder diagram. Each rung comprises a series of normally open contacts 102, normally closed contacts 108 and a relay coil 104 which may be combined in series or in parallel by means of branch starts 110 and branch ends 112. Each contact 102 or 108 represents an input or internal condition to be tested and the coil 106 represents an operating device to be activated for that part of the ladder logic program. For example, if the input conditions represented by contacts 102' and 108' are such that contact 102' and 108' are closed, then the operating device represented by coil 104 is activated. By standard convention, electrical current is considered only to flow from left to right in the ladder diagram, accordingly each contact may be considered to have a "head" terminal and a "tail" terminal with current flowing from tail to head.

I-code

Referring again to FIG. 4, the ladder logic program 50 is entered as I-code into the industrial controller 10 through the keyboard 52 of the programming terminal 21. I-code is comprised principally of the following ASCII instruction mnemonics each representing an I-code symbol.

XIC: examine if closed (normally open)
XIO examine if open (normally closed)
SOR, EOR: start of rung, end of rung
BST, BND: branch start, branch end
LST, LND: start of level, end of level
OTE : output enable Many additional output symbols may also be used such as timers and counters. Such outputs follow the same rules, for the purpose of the following discussions, as a normal output.

Each symbol represents a graphic element of the ladder diagram. A "SOR" symbol, indicates the start of a ladder rung and an "EOR" symbol indicates the end of the ladder rung. A branch start "BST" symbol indicates any node connecting two or more contacts at which the tails of all but one contact are connected to the head of another contact or the power rail 100. Conversely, a branch end "BND" symbol indicates any node connecting two or more contacts at which the heads of all but one contact are connected to the tail of another contact or to the output coil. The "LST" symbol indicates the start of a new level of contacts within a branch and the "LND" symbol indicates the end of that level of contacts.

Each contact within the ladder diagram is denoted in I-code as an "XIC" or "XIO" symbol depending on whether the contact is normally open or normally closed respectively. Each contact symbol also incorporates a sequential integer which uniquely identifies that contact. The "OTE" symbol is represents an output coil.

The I-code equivalent for the ladder logic diagram shown in FIG. 12(a) is shown in FIG. 12(b). The particular ordering of the contacts produced in the creation of I-code is termed "series jump ordering" and may be describe briefly as follows: contacts in the ladder logic diagram are ordered and numbered consecutively starting at the top of the rung from left to right. When a branch end is encountered, the numbering is continued with unnumbered contacts at the beginning of the next branch level. This process continues until all contacts ar numbered.

DESCRIPTION OF THE PREFERRED EMBODIMENT

Hardware

Figure 1:
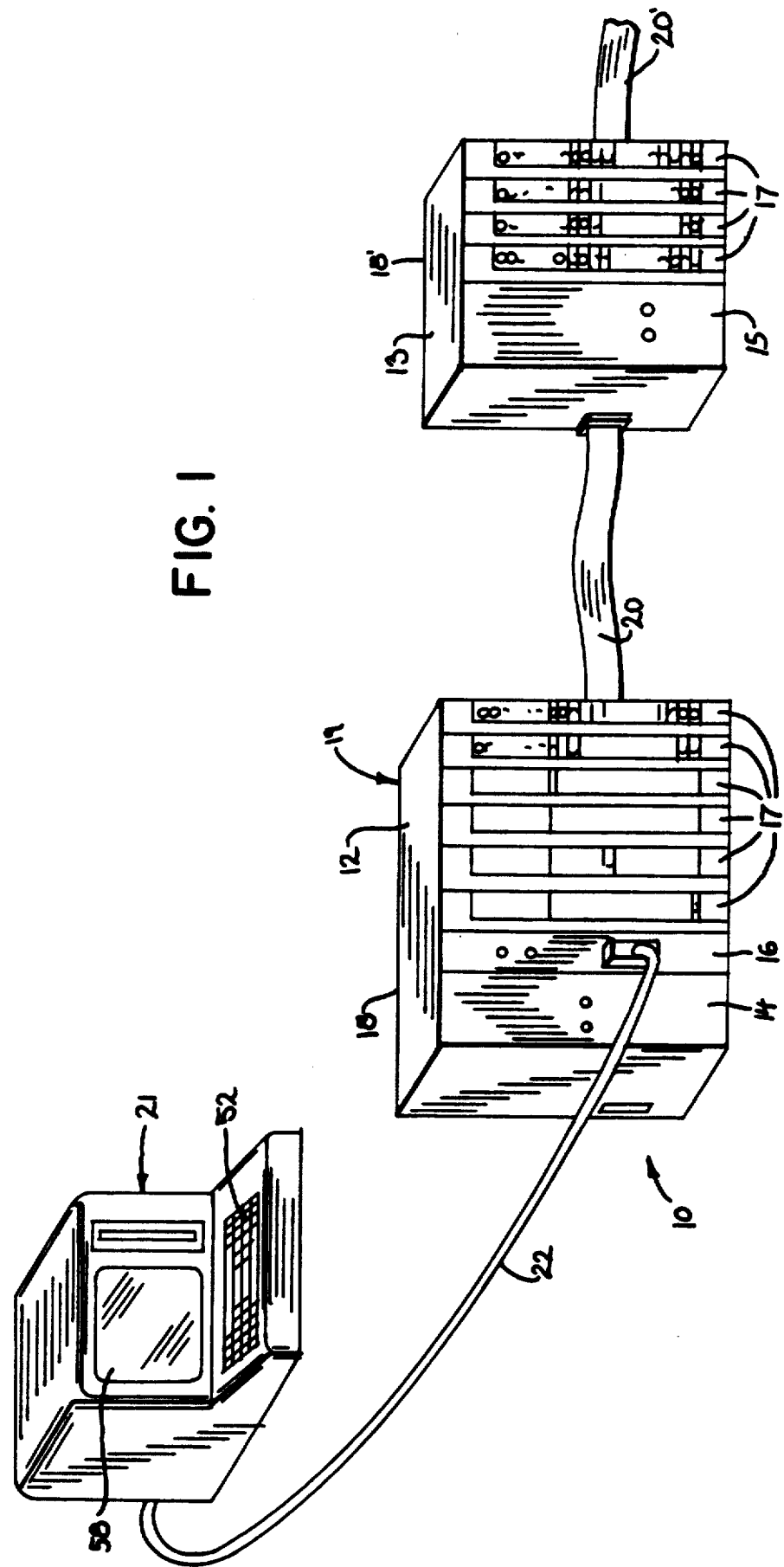
FIG. 1 is a perspective view of an industrial controller which incorporates the present invention.
Figure 2:
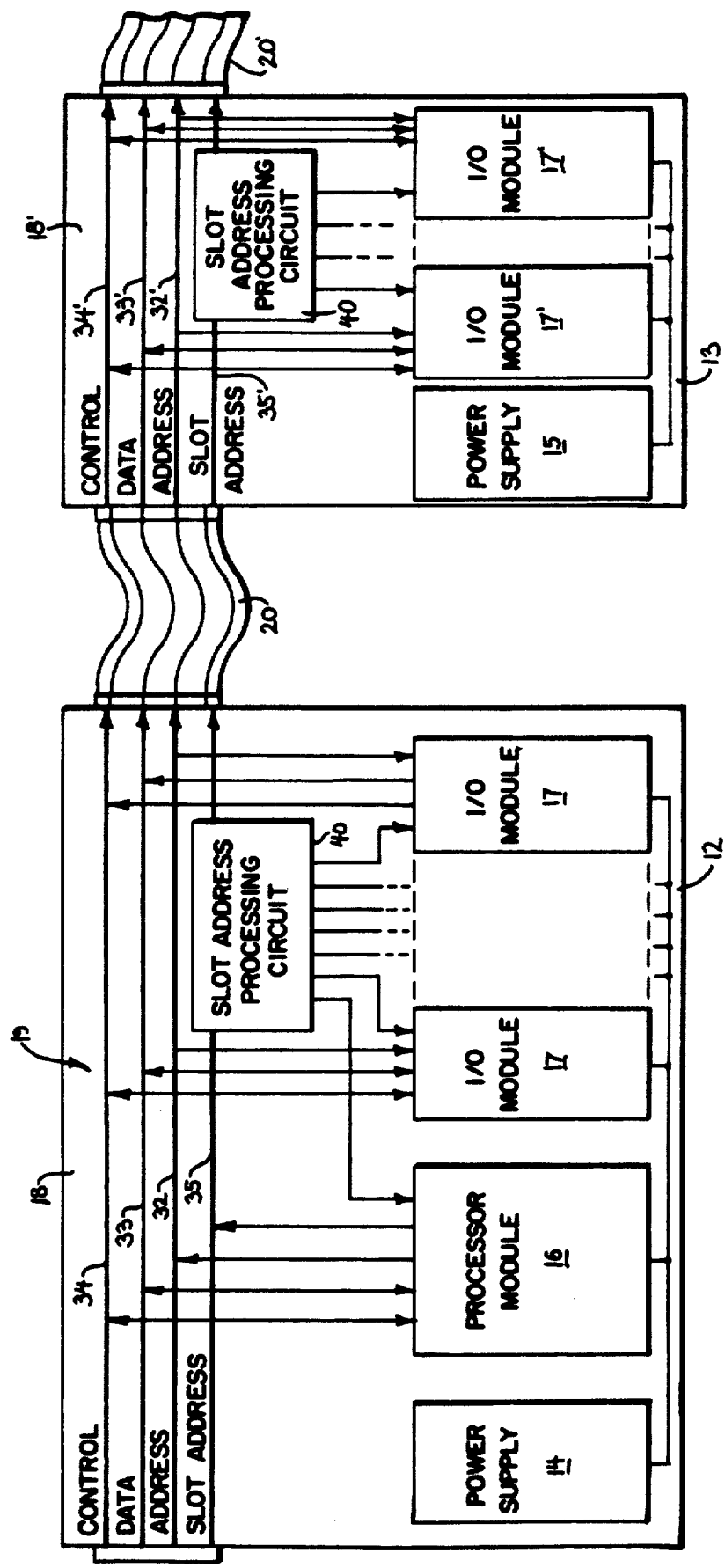
FIG. 2 is a schematic block diagram of the industrial controller components shown in FIG. 1.

With initial reference to FIGS. 1 and 2, a industrial controller, generally designated as 10, includes two racks 12 and 13 with separate power supplies 14 and 15 respectively. Each of the racks 12 and 13 has a number of slots within which different functional modules 16 and 17 can be received. A unique address is assigned to each rack slot in order to identify the module received therein. The two racks 12 and 13 also include a backplane 18 and 18' respectively, having electrical connectors and conductor buses which interconnect the functional modules 16 and 17 and provide power to the modules from the power supplies 14 and 15. Specifically, the backplanes 18 and 18' respectively incorporate a parallel address bus 32 and 32', a parallel data bus 33 and 33', a set of control lines 34 and 34', and a five bit parallel slot address bus 35 and 35'. A separate connector is provided on the backplane for each slot in the rack to couple these buses and control lines to a module in the slot. A multiconductor cable 20 interconnects the backplanes 18 and 18' of the two racks 12 and 13 to form a common system backplane, designated 19. Another multiconductor cable 20' extends the system backplane from the second rack 13 to other racks of the industrial controller which are not illustrated. The racks are connected in a daisy chain by the cables 20 and 20'. A detailed description of the backplane suitable for use with the present invention is disclosed in U.S. Application No. 7,223,312, filed July 25, 1988, and entitled: "Multiple Rack Programmable Controller with Relative Rack Slot Addressing".

The first rack 12 contains a processor module 16 which executes a user defined ladder logic program stored in the module's memory to operate the controlled equipment coupled to the industrial controller 10. A programming terminal 21 is connected by a cable 22 to the processor module 16 for monitoring the operation of the industrial controller and for programming the processor module 16. The processor module 16 is connected to the backplane buses 32, 33, 35 and control lines 34.

The first rack 12 also contains a number of input/output modules 17 which electrically interface the processor 16 to sensing and operating devices on the machine controlled by the industrial controller 10. As used herein, the term I/O module refers to a module which interfaces to external devices on the controlled machine. Such I/O modules can have solely an input function, solely an output function, or both input and output functions. I/O modules which provide an input function couple the processor module 16 to sensing devices on the controlled machine, while the output function modules interface to operating devices on the controlled machine. Each of the I/O modules may be an a.c. input or output device, a d.c. input or output device, or provide an input/output interface to analog devices, such as resolvers and position indicators. The typical industrial controller 10 includes a mix of different types of I/O modules.

Figure 3:
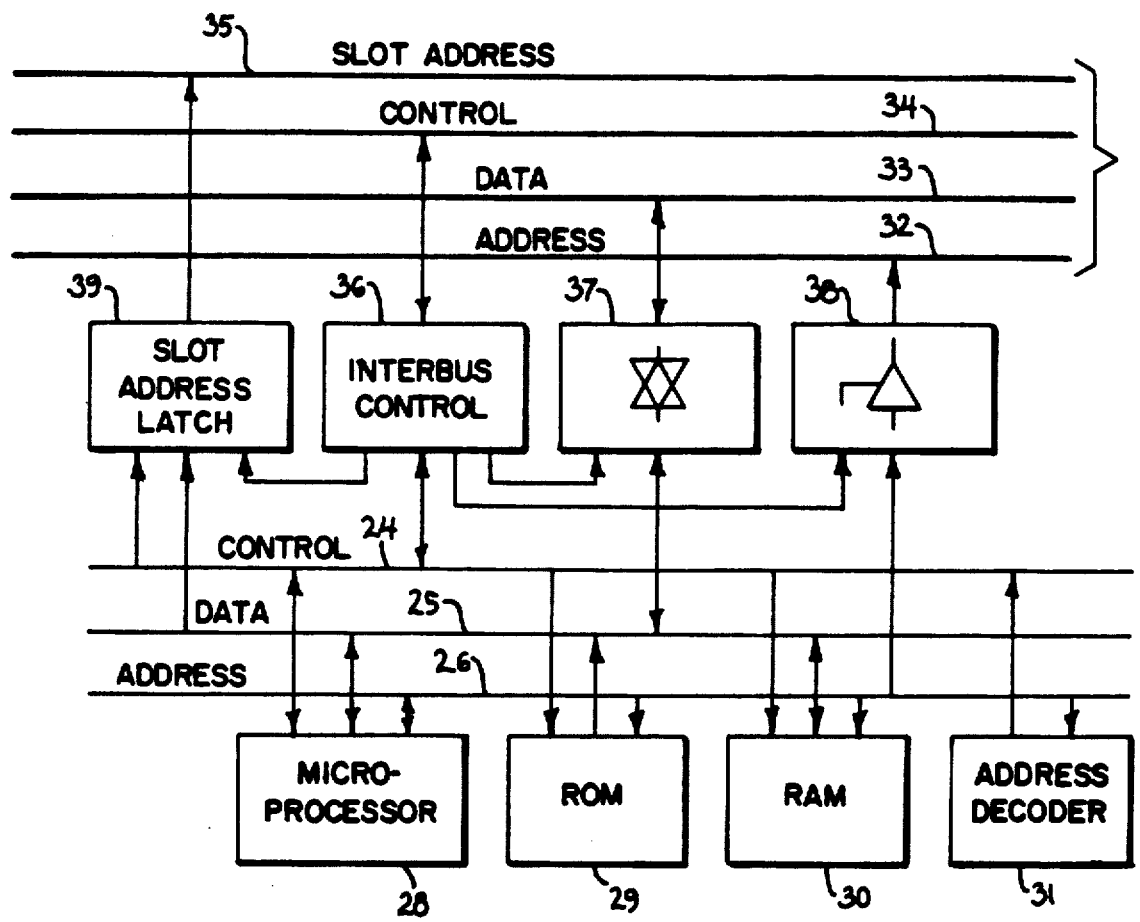
FIG. 3 is a schematic block diagram of the processor module shown if FIG. 2.

The different components of the processor module 16, shown schematically in FIG. 3, are interconnected by a set of three internal buses: a control bus 24 consisting of a number of individual control lines running between different components, a parallel data bus 25 and a parallel address bus 26. A microprocessor 28, such as the MCS-8051 manufactured by the Intel Corporation, Santa Clara, California, is coupled to the three internal buses 24–26. The microprocessor 28 executes an operating system program stored in a read only memory (ROM) 29 which controls the overall operation of the industrial controller 10 and executes a user defined ladder logic program that is stored within a random access memory (RAM) 30 as machine executable object code. Also stored in RAM 30 is a standard input/output data table which retains the status of the sensing and operating devices. The RAM 30 also provides storage locations for counters, timers and intermediate computation values used by the microprocessor 28 in executing the operating and ladder logic programs. An address decoder 31 responds to specific addresses sent over the module address bus 26 by generating control signals on bus 24 which enable the microprocessor to access memories 29 and 30, as well as the system backplane 19.

Access to the system backplane buses 32–35 by either the processor module 16 or by another module is governed by an interbus control circuit 36 which can comprise an of several well known circuits for performing bus access arbitration. In response to the proper request signal, the interbus control circuit 36 enables a set of bidirectional data buffers 37 to couple the internal data bus 25 of the processor module 16 to the backplane data bus 33. Similarly, the interbus control 36 enables a set of address buffers 38 to couple the processor module address bus 26 to the backplane address bus 32. A slot address latch 39 can be enabled by the interbus control circuit 36 to apply a five bit data word in parallel from the processor module data bus 25 to a backplane slot address bus 35. The interconnection of the internal buses of the processor module 16 to those of the backplane 19 enables the microprocessor 28 to selectively access any one of the I/O modules 17 in the racks 12 and 13.

Series Jump Format

As discussed, the I-code 54, as represented in FIG. 4, is not executed by the industrial controller 10 but is compiled 56. This machine code is in "series jump format". In series jump format each contact is represented by a single jump or branch instruction. This instruction tests the I/O input image table bit representing the contact, and jumps either to another contact testing instruction or to a coil energizing or de-energizing routine Referring to FIG. 12(c) there is shown the simplified series jump format compiled form of the ladder logic rung shown in FIG. 12(a) represented in MCS-51 machine code mnemonics. By standard programming convention, the first column after the line numbers is reserved for labels used to designate jump targets. The next column is the mnemonic for the machine code instruction, either JNB ("jump if bit not set"), or JB ("jump if bit set"). The next column contains the operands for the instruction, the first operand identifying the bit in the input image table to be tested by the JNB or JB instruction and the second operand indicating the label of the jump target. In actual practice, the bits must first be retrieved from external RAM. A detailed description of the machine code instruction set for the MCS-51 is contained in Intel Corporation's "Microcontroller User's Manual Order number 210359-001 (May 1982).

The compiler executed by the programming terminal 21 operates on each ladder rung in the I-code of FIG. 12(b) to produce machine code of the type shown if FIG. 12(c). In order to avoid unresolved forward references, the compiler operates on the I-code from right to left, and generates the compiled machine code from last instruction to first instruction.

Referring to FIG. 6 the first step of the compiling process, shown at process block 201, creates the machine code instructions for setting and resetting the output image table bit associated with energizing or deenergizing the rung's coil, labeled "ON" and "OFF" respectively in the compiled code. These two labeled steps form the last two instructions of the compiled code and will henceforth be referred to as the "COIL ON" routine and the "COIL OFF" routine.

The second step of the compilation process, shown in process block 200, is the sorting of the I-code so as to produce an succeeding contact array A. The contents of each element A(i) of array A contains the number of the contact immediately to the right of contact "i" on the ladder diagram of the ladder logic program or a symbol representing the output coil if the output coil is immediately to the right. Thus in the ladder logic program shown in FIG. 12(a), the succeeding contact for contact "3" would be contact "5" and the contents of element A(3) in array A would be "5". The succeeding contact for contact "2" is the output coil and the contents of A(2) would be the coil symbol. A routine for creating this list of succeeding contacts is shown in FIG. 7 and is discussed in detail below.

Referring again to FIG. 6, at process block 202, each element A(i) is examined starting at contact n, where n is the highest numbered contact in the rung being compiled. Depending on the value of the succeeding contact and the I-code contact symbol associated with "i", the compiler will generate either a "normal jump" instruction or a "reverse jump" instruction. As used herein, a "normal jump" is a machine code JB instruction if the contact symbol associated with "i" is "XIC" and a JNB instruction if the contact symbol associated with "i" is "XIO". Likewise a "reverse jump" is a JNB instruction if the contact symbol associated with "i" is an "XIC" contact and a JB instruction if the contact symbol associated with "i" is "XIO".

Specifically, at process block 204, A(i) is tested to see if it contains the output coil as the succeeding "contact". If so, the compiler outputs a "normal jump" instruction to the "ON" label, i.e. the COIL ON routine. The first compiled instruction is stored immediately preceding the COIL ON and COIL OFF routines.

If at process block 204, the succeeding contact A(i) is determined not to be the coil, at process block 208 the succeeding contact A(i) is examined to see if it is one greater than the present contact "i". If so, the compiler outputs a reverse jump instruction to the next "open" contact "k" after the present contact, per process block 210, and 214. The routine for identifying the next open contact "k" is shown in FIG. 8 and will be described further below. If there is no next contact "k", then the compiler outputs the machine code for a reverse jump to the COIL OFF routine.

At process block 212, the succeeding contact A(i) is tested to see if it is greater than one plus the present contact i. If so, the compiler outputs a normal jump to the succeeding contact A(i).

By means of process blocks 218, 220, the steps of process blocks 204, 208, and 212 are repeated for each contact "i" of the I-code, in reverse order, until the entire I-code rung is compiled. The routine for creating the array of succeeding contacts A, as used in the above compiler program and as shown in FIG. 7, begins by setting a counter variable to −1 and reviewing the I-code from the beginning, as indicated by process block 222, 224 and 226. As shown in process blocks 228 and 230, every time a LND ("level end") symbol is encountered in the I-code, this counter is set equal to 0. When a BST ("branch start") symbol is encountered the counter is incremented by one, per process blocks 232 and 234. And when a BND ("branch end") symbol is encountered, the counter is decremented by one, per process block 240 and 242.

As shown in process block 240, if a contact is encountered and the counter value is less than 0 then that contact is the succeeding contact for "i" and is stored in A(i) in process block 242.

Per process block 246, providing the succeeding contact has not been identified per process block 242, the remainder of the I-code is reviewed. If no succeeding contact is identified for contact "i", then A(i) receives a predetermined symbol indicating that the coil is the "succeeding contact". When either a contact or the coil is identified as a succeeding contact for contact "i", then "i" is incremented per process blocks 224 and 250 until a succeeding contact A(i) is obtained for all contacts in the rung.

Shown in FIG. 8 is the routine for identifying the next open contact, also used in the above described compiler program. At process block 250 and 252, the present contact "i" is received from the compiler program and a counter and a flag variable are set equal to 0. The I-code is examined from that contact "i", to the right, as indicated at process block 254. When a BST ("branch start") symbol is encountered in the I-code the counter is incremented by one, per process blocks 256 and 258. When a BND ("branch end") symbol is encountered, the counter is decremented by one, and the flag variable is reset per process block 260 and 262. Per process blocks 264 and 268, when a LND ("level end") symbol is encountered and the counter equals zero, the flag is set.

At process block 270, if a contact is encountered while the flag is set that contact is the next open contact k. If at process block 274, the the end of the rung is encountered before a next open contact "k" is identified, "k" receives the label of the COIL OFF routine.

The format of the compiled code produced by the above described compiling process shall be referred to herein as series jump format machine code The decompiler of the present invention is executed by the programming terminal 21 to convert such series jump format code to a ladder logic diagram or to an I-code format for purposes of editing or review by the user, as shown if FIG. 4. The decompiling is accomplished without the use of additional source code "tokens" embedded in the machine code.

Ladder Logic Decompiler

Referring now to FIG. 9, the first step of the decompiler, as shown in process block 280 is to assign an index number "i" to the first operand of each jump statement. As discussed above, this first operand represents the input image address of a particular input contact and hence the index "i" may be considered an input contact number. For reasons of convenience, the index number "i" is also used to refer to the particular jump statement embracing that operand. At process block 282 an array T(i) is generated where T(i) is the target of the jump statement associated with operand i. The target may be either another jump statement as identified by its operand "i", or the COIL ON routine identified as a jump to the "ON" label or the COIL OFF routine identified as a jump to the "OFF" label. At process block 284, a second array B(i) is formed where B(i) contains either the string "XIO" if the jump statement associated with operand "i" is a JNB instruction or the string "XIC" if the jump statement associated with operand "i" is a JB instruction. The values B(i) may be toggled: toggling converts an XIO to an XIC and vice versa.

At process block 286 a zeroed, interconnection matrix M is generated with rows equal to the maximum number of contacts allowable on a rung and n columns where n is the maximum value of "i", i.e. the number of jump instructions or contacts in the rung to be decompiled. Starting at process block 290 with jump instruction n, a matrix index variable a is set to 1. At process block 292, T(i) is tested to see if the jump target is a jump to the COIL ON routine. If it is, M(1,i), where 1 is the row and "i" is the column of the interconnection matrix M, is loaded with a +1 terminal marker. At process block 296, T(i) is tested to see if the jump target is to the COIL OFF routine. If it is, the matrix index variable a is incremented by one and B(i) is toggled, and for each column x of M with a column number greater than "i" and containing no −1 terminal markers, M(a,x) is loaded with a −1 terminal marker per process block 298.

At process block 302, T(i) is tested to see if the jump target is another jump statement. If so, the decompiler calls the number target routine, as shown in FIG. 10.

Referring now to FIG. 10, the first step of the number target routine shown as process block 310, examines the column T(i) of matrix M to see if it contains a −1 terminal marker. If so, in process block 312, a +1 terminal marker is placed in matrix location M(x,i) where x is the row containing the −1 terminal marker in matrix column T(i).

If the column T(i) of matrix M does not contain a −1 terminal marker then the matrix index variable a is incremented by one, B(i) is toggled, and matrix location M(a,i) is loaded with a +1 terminal marker. Also, each column of the matrix x greater than column "i" and less than column T(i) which does not contain a −1 marker is loaded with a −1 terminal marker. The routine then returns to the decompile program shown in FIG. 9.

At process block 305 the decompile program checks to see if all jump statements "i" have been transformed. If not, the program moves to the next previous jump instruction, per process block 307, and loops until all jump instructions have been processed by the above steps. If at process block 305, all jump statements have been processed then the matrix index variable a is incremented by one and a −1 terminal marker is placed in each column of matrix M that does not contain a −1 terminal marker.

The interconnection matrix M now contains a representation of the ladder logic diagram to be reconstructed. Each column number represents a contact and each row number represents a node at which contacts may be joined. A "+1" terminal marker in a matrix element indicates an "upstream" terminal of a contact and connection between that terminal and any other contact with a −1 terminal marker or +1 terminal marker in that row. A "−1" terminal marker in a matrix element indicates a "downstream" terminal of a contact and a connection between that terminal and any other contact with a −1 terminal marker or a +1 terminal marker in that row. A graphic reconstruction of the ladder logic diagram may rapidly be formed by connecting the contacts as so indicated. The interconnection matrix M may also be represented by two vectors equal in length to the maximum number of contacts in a rung with elements corresponding to contact numbers. The first vector's elements contains the row number of the contact's +1 markers. The second vector contains the row number of the contact's −1 markers.

To produce the decompiled I-code in addition to the ladder diagram, the decompiler calls the matrix simplification routine shown in FIG. 11.

The first step of the matrix simplification routine is to initialize a string array I with the contact identifier strings stored in B(i) i.e. XIC and XIO. At process block 318 the interconnection matrix M is inspected for adjacent matching columns. If a match is found, the rows containing the +1 and −1 markers are examined per process block 321. If there is not another +1 element in the row containing the +1 elements or if there is not another −1 element in the row of the −1 element, then the strings BST and LST ("branch start" and "level start") are inserted in the array I prior to the contact identifier strings for the first matching columns, the string LND and LST ("level end" and "level start") are inserted in array I between the contact identifiers for the first and second matching columns and the strings LND and BND ("level end" and "branch end") are inserted in array I after the second matching string. If per process block 321 there is both an additional +1 and −1 element in the corresponding rows of the matching columns, an LND, LST is placed between the contact identifiers for those columns (the BST, LST and LND BND will be entered later when the combined column is combined with other columns.) One of the two columns is then eliminated reducing the matrix by one column per process block 328.

At process block 326, the matrix M is searched for rows containing only a single adjacent −1 terminal marker and +1 terminal marker. If such a row is found, the two columns are concatenated, again reducing the total number of columns in the matrix M by one. No additions are made to array I.

These two processes are continued until there is only a single matrix column left as detected in process block 334. At this time, the array I contains the decompiled I-code. If Boolean logic equation is desired, the above translation is similar except that BST LST is replaced with "(", LND LST is replaced with a "+" (logical or) and LND BND is a ")". The resulting equation is a Boolean expression with the implied multiplication between terms representing an "AND" function and the addition of terms representing and "OR" function.

Decompilation Example

Figure 13A:
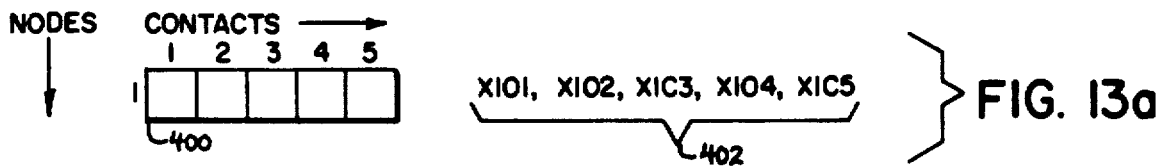

FIG. 13(a) shows the first step in decompiling the machine code of FIG. 12(c). The interconnection matrix M 400 is formed, as shown by process block 286 of the decompiler, and contains five columns corresponding to the five contacts of the ladder diagram of FIG. 12(a). Interconnection Matrix M may have a specified maximum number of rows equal to the maximum number of contacts per rung. In the preferred embodiment, however, only one row is shown initially in FIG. 13(a). A string array 402 holding symbols corresponding to the values of B(i), determined as described above, is also created per process block 284 of the decompiler.

Figure 13B:
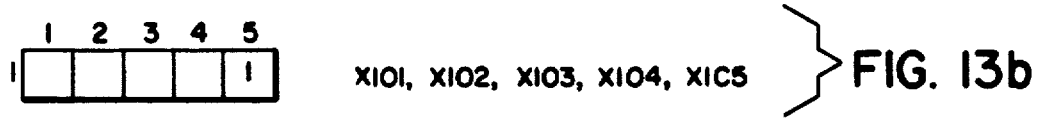

In the decompilation of step 5 of the machine code, shown in FIG. 12(c), which shows a jump to the "COIL ON" routine, a +1 terminal marker is placed in the first row and fifth column of the matrix M per the matrix in FIG. 13(b). This reflects process blocks 292 and 284 of the compiling program.

Figure 13C:
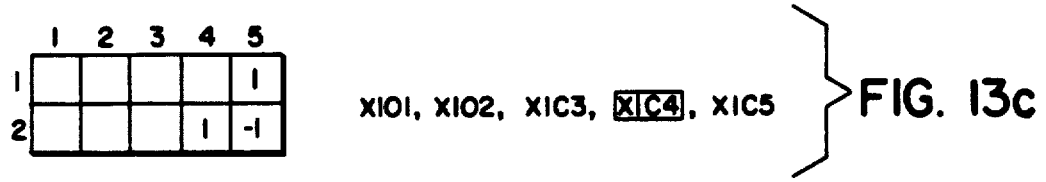

Referring to FIG. 13(c), a +1 terminal marker is placed in the fourth column and a −1 terminal marker is placed in the fifth column of row two of the matrix M per process block 296 and 298 of the decompiler. These actions are in response to the fourth machine language instruction, shown in FIG. 12(c), which contains a jump to the "COIL OFF" routine. Note that the fourth symbol in string I has been "toggled" from the symbol for a closed contact to the symbol for an open contact.

Figure 13D:
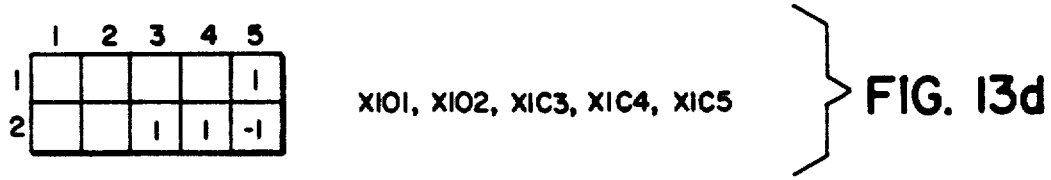

FIG. 13(d) shows the results of decompiling the third machine language instruction which invokes a jump to the fifth machine language instruction. Per process block 302 and the number target routine shown in FIG. 10, a +1 terminal marker is placed in row two column three of matrix M reflecting the fact that column five, the column corresponding to the target of the jump, already contains a −1 terminal marker as tested for in process block 310.

Figure 13E:
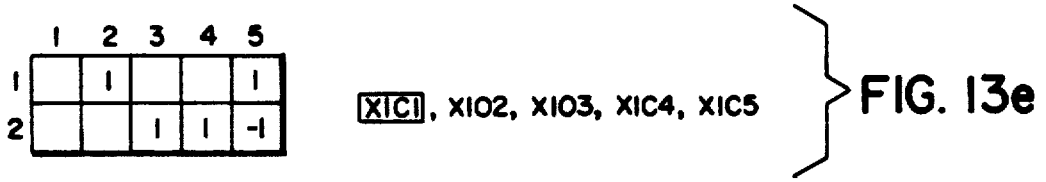

The second machine language instruction invokes a jump to the "ON" routine and hence row one column two of matrix M receives a +1 terminal marker per process block 292 and 294 as shown in FIG. 13(e).

Figure 13F:
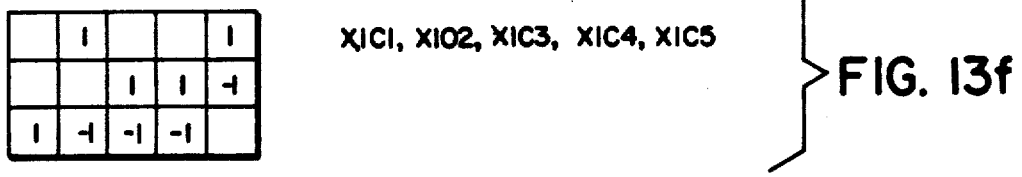

Per FIG. 13(f), in response to the first machine language instruction, which invokes a jump to the "OFF" routine, row three column one of matrix M receives a +1 terminal marker and row three columns two through four receive a −1 terminal marker. Column 5 which already contains a −1 terminal marker does not receive a −1 terminal marker per process block 298. Again, note that the sense of the first symbol in string array I is changed from a symbol indicating a normally open contact to a symbol indicating a normally closed contact.

Figure 13G:
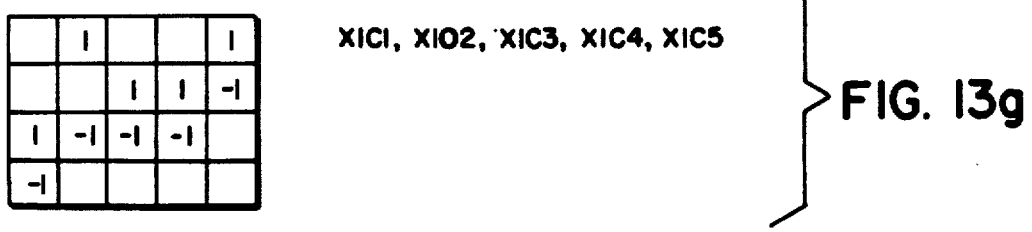

Per process block 305 and 306, after all jump statements have been decompiled, a new row is created in matrix M and any columns which do not have −1 terminal marker's receive a −1 terminal marker as shown in FIG. 13(g). At this point, the matrix M has been completed and the matrix simplification routine is called, as shown in FIG. 11.

Referring to FIG. 15(a)-(c) a direct reconstruction of the ladder logic diagram is illustrated. In FIG. 15(a), the completed interconnection matrix M is shown rotated counterclockwise by 90°. FIG. 15(b) shows contacts superimposed on the interconnection matrix according to their terminal positions as indicated by the +1 terminal marker and −1 terminal marker in the interconnection matrix. FIG. 15(c) shows the resulting ladder logic diagram with the contacts shifted to the highest empty position per convention and the output coil and power rails added.

The I code may be extracted from the interconnection Matrix by means of the matrix simplification routine.

The matrix simplification routine applies two rules, one for simplifying parallel contacts and one for simplifying series contacts. The first matrix simplification rule embodied in process blocks 318, 322, 324, and 328, is applied to columns three and four as identified in FIG. 14(a). These columns are identical and therefore may be combined as parallel contacts The result of such combination is shown in FIG. 14(b) in which the string symbols in I include inserted branch and level delineators.

The matrix of FIG. 14(b) has been marked to identify the new combined column, termed "(3+4)", and column 5 which now may be simplified as series contacts per the rules embodied in process blocks 326, 332, 330. As a result of this simplification, these columns are combined as column "(3+4).5" as shown in FIG. 14(c). No delineators are added to the string array I.

FIG. 14(c) identifies this new column (3+4).5 and column 2 as columns which may be simplified as parallel contacts per process blocks 318, 322, 324, and 328 as described above. The effect of this simplification is shown if FIG. 14(d). The final two columns as shown in 14(d) may be combined as series contacts per process blocks 326, 332 and 330 producing the string array I as shown in FIG. 14(e) which is the decompiled I-code.

A preferred embodiment of the invention has been described, but it should be apparent to those skilled in the art that many variations can be made without departing from the spirit of the invention. For example, additional output devices such as counters and timers may be readily accommodated by this decompilation process by the substitution of timer or counter ON and OFF routines for the COIL ON and COIL OFF routines. Also, other types of contacts may be used in addition to the XIO and XIC contacts described, for example, other binary state contacts which test two numbers for a particular relationship such as "greater than", "equal to" or "not equal to" or combination of these relationships.

I claim:

1. A method of decompiling a series jump format machine code implementation of a ladder logic program comprised of a series of jump statements, each examining a contact status and jumping to a target, and including a COIL ON and a COIL OFF routine, into a ladder logic diagram comprised of interconnected numbered succeeding contacts arranged in rungs, each contact with a head and tail terminal, and an output coil, comprising the steps of:
   a) assigning an index number to each jump statement according to its order in the machine code;
   b) determining the target for each jump statement;
   c) creating an interconnection matrix of elements having columns corresponding to the number of jump statements and hence to the number of contacts in the ladder logic diagram and rows corresponding to the number of points of interconnection between contacts;
   d) placing head marker elements and tail marker elements in the matrix by analyzing each jump statement and its target so that each column will have only one head marker element and one tail marker element representing the head and tail terminal of a contact whose sequential number corresponds to the column number and so that the row of the head marker element and the row of the tail marker element define interconnections between the terminals of that contact and the terminals of contacts associated with other columns; and
   e) displaying a ladder logic diagram by:
      i) displaying a contact having a head and tail terminal for each column the contact having a head and tail terminal;
      ii) connecting the head terminal of each contact to the head terminals of all other contacts having head marker elements in the row of the head marker element of that contact and to the tail terminals of all other contacts having a tail marker element in the row of the head marker element of that contact; and
      iii) connecting the tail terminal of each contact to the head terminals of all other contacts having a head marker element in the row of the tail marker element of that contact and to the tail terminals of all other contacts having a tail marker element in the row of the tail marker element of that contact.

2. A method of decompiling series jump format machine code comprised of a series of jump statements, each examining a contact status and jumping to a target, and including a COIL ON and a COIL OFF routine, into a I-code comprised of machine readable symbols including "branch start", "level start", "branch end", "level end", "normally open" and "normally closed", and related to a ladder logic diagram of sequentially numbered contacts arranged in rungs, comprising the steps of;
   a) assigning an index number to each jump statement according to its order in the machine code;
   b) determining the target for each jump statement;
   c) creating an interconnection matrix of elements having columns corresponding to the number of jump statements in the ladder logic diagram and rows corresponding to the number of points of interconnection between contacts;
   d) placing a head marker elements and a tail marker elements in the matrix for each jump statement by analyzing each jump statement and its target, and so that each column will have only one head marker element and one tail marker element corresponding to the head and tail terminal of a contact with a sequential number corresponding to the column number and where the row of the head marker element and the row of the tail marker element define interconnections between the terminals of that contact and the contacts associated with other columns;
   e) creating an array of normally open and normally closed contact symbols corresponding to each jump statement;
   f) toggling the contact symbol if the target of the corresponding statement is COIL OFF;
   g) toggling the contact symbol if the target is another statement and the column of the interconnection matrix corresponding to that target statement contains a tail marker element;
   h) identifying first and second identical adjacent columns of the interconnection matrix, combining them, and
      i) if there are no other head marker elements in the row having the head marker element and if there are no other tail marker elements in the row having the tail marker element placing a "level end" symbol and a "level start" symbol between the contact symbols corresponding to the combined columns;
      ii) otherwise, placing a "branch start" and "level start" symbol before the contact symbol corresponding with first column, placing a "level end" symbol and a "level start" symbol between the contact symbols corresponding to the combined columns and placing a "level end" and a "branch end" symbol after the contact symbol corresponding to the second column;
   i) identifying rows with a single adjacent head and tail marker elements and adding the columns containing those markers.

3. The method of claim 1 wherein the head marker elements and tail marker elements are placed in the matrix by analyzing each jump statement from last to first, and its target, as follows:
   i) if the target is COIL ON, placing a head marker element in the interconnection matrix at the column corresponding to the index number of the statement and the first row;
   ii) if the target is COIL OFF, placing a head marker element in the interconnection matrix at the column corresponding to the index number of the statement and a next row and placing a tail marker element in that same row in each column numbered higher than that index number such column not having a tail marker element;

iii) if the target is a jump statement then:
  A) if the index number of the target contains a tail marker element placing a head marker element in the interconnection matrix at the column corresponding to the index number of the statement and at the row of that tail marker element;
  B) if the index number of the target does not contain a tail marker element, placing a head marker element in the interconnection matrix at the column corresponding to the index number of the statement and at a next row and placing a tail element marker in that next row in each column numbered higher than the index number of the statement and less than the index number of the target such column not having a tail marker element; and iv) if the targets of all index numbers have been exhausted then placing a tail marker element in each column of a next row such column not having a tail marker element.

* * * * *